United States Patent
Fromm et al.

(10) Patent No.: US 9,782,964 B2
(45) Date of Patent: Oct. 10, 2017

(54) SYSTEM AND METHOD FOR REMOVING THREE-DIMENSIONAL PRINTED PARTS FROM A PLATEN USING INDUCTIVE HEATING AND GRAVITY

(71) Applicant: Xerox Corporation, Norwalk, CT (US)

(72) Inventors: Paul M. Fromm, Rochester, NY (US); Jeffrey J. Bradway, Rochester, NY (US); Timothy J. Clark, Weedsport, NY (US); Jorge M. Rodriguez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 365 days.

(21) Appl. No.: 14/677,161

(22) Filed: Apr. 2, 2015

(65) Prior Publication Data

US 2016/0288415 A1    Oct. 6, 2016

(51) Int. Cl.
| | |
|---|---|
| *B29C 67/00* | (2017.01) |
| *B33Y 10/00* | (2015.01) |
| *B33Y 40/00* | (2015.01) |
| *B33Y 70/00* | (2015.01) |
| *B33Y 30/00* | (2015.01) |
| *B33Y 50/02* | (2015.01) |

(52) U.S. Cl.
CPC .......... *B33Y 10/00* (2014.12); *B29C 67/0092* (2013.01); *B33Y 40/00* (2014.12); *B29C 67/0051* (2013.01); *B29C 67/0055* (2013.01); *B29C 67/0059* (2013.01); *B29C 67/0085* (2013.01); *B29C 67/0088* (2013.01); *B29C 67/0096* (2013.01); *B33Y 30/00* (2014.12); *B33Y 50/02* (2014.12); *B33Y 70/00* (2014.12)

(58) Field of Classification Search
CPC ............ B29C 67/0051; B29C 67/0055; B29C 67/0059; B29C 67/0085; B29C 67/0088; B29C 67/0092; B29C 67/0096; B33Y 10/00; B33Y 30/00; B33Y 40/00; B33Y 50/02; B33Y 70/00
USPC ............................ 425/375, 174.4; 264/401
See application file for complete search history.

(56) References Cited

U.S. PATENT DOCUMENTS

| | | | |
|---|---|---|---|
| 4,052,217 A | 10/1977 | Watkinson | |
| 5,094,095 A | 3/1992 | Barrois et al. | |
| 5,141,680 A * | 8/1992 | Almquist ................ | B29C 41/12 118/120 |
| 6,269,938 B1 | 8/2001 | Lutz | |
| 6,571,702 B2 | 6/2003 | Wotton et al. | |
| 8,911,199 B2 | 12/2014 | Herrmann et al. | |
| 2004/0262803 A1* | 12/2004 | Neilsen ............... | B29C 67/0059 264/113 |
| 2014/0220168 A1* | 8/2014 | Perez .................. | B29C 37/0007 425/161 |

(Continued)

*Primary Examiner* — Matthew Daniels
*Assistant Examiner* — Lawrence D Hohenbrink, Jr.
(74) *Attorney, Agent, or Firm* — Maginot Moore & Beck LLP

(57) ABSTRACT

A method of manufacturing a three-dimensional object facilitates removal of the three-dimensional object from the platen on which the object was formed. The method includes rotating the platen from a horizontally level position to a position at an angle to the level position to enable gravity to urge the three-dimensional object away from the platen and inductively heating the platen to melt support material at the boundary of the object and the platen to release the three-dimensional object from the platen.

9 Claims, 5 Drawing Sheets

(56) References Cited

U.S. PATENT DOCUMENTS

2014/0265032 A1    9/2014  Teicher et al.
2016/0067740 A1*  3/2016  Voris .................. B29C 67/0055
                                                427/402
2016/0096326 A1*  4/2016  Naware ............... B29C 67/0088
                                                425/143

\* cited by examiner

SYSTEM AND METHOD FOR REMOVING THREE-DIMENSIONAL PRINTED PARTS FROM A PLATEN USING INDUCTIVE HEATING AND GRAVITY

TECHNICAL FIELD

The device and method disclosed in this document relates to three-dimensional object printing and, more particularly, to removal of a three-dimensional object from a platen on which the object was formed.

BACKGROUND

Digital three-dimensional manufacturing, also known as digital additive manufacturing, is a process of making a three-dimensional solid object of virtually any shape from a digital model. Three-dimensional printing is an additive process in which one or more printheads or ejector heads eject successive layers of material on a substrate in different shapes. The substrate is supported either on a platform that can be moved three dimensionally by operation of actuators operatively connected to the platform, or the printhead or printheads are operatively connected to one or more actuators for controlled movement of the printhead or printheads to produce the layers that form the object. Three-dimensional printing is distinguishable from traditional object-forming techniques, which mostly rely on the removal of material from a work piece by a subtractive process, such as cutting or drilling.

Manufacturing of three-dimensional printed parts at high speed is a significant challenge because many of the processes involved are time consuming and often done manually. Automation has provided for higher speed and more efficient processing of three-dimensional printed parts. One area of concern relates to removal of the three-dimensional printed part from the build platen. Often the three-dimensional printed part sticks to the build platen and can be challenging to remove. Current methods for part removal include heating, impacting, scraping, and freezing. These methods are generally cumbersome, time consuming, and risk damaging the part or the build platen. What is needed is a method for removing a three-dimensional printed part from a build platen that is fast, reliable, and easily automated.

SUMMARY

A method of manufacturing a three-dimensional object facilitates the removal of objects from a platen. The method includes operating ejectors with a controller with reference to digital image data of a three-dimensional object to eject drops of material towards a platen and form a plurality of layers that produce the three-dimensional object on the platen, rotating the platen from a first position that is horizontally level to a second position that enables gravity to urge the three-dimensional object off of the platen, and operating an inductive heater to heat the platen and release the three-dimensional object from the platen.

A printer for manufacturing a three-dimensional object includes a plurality of ejectors configured to eject drops of material, a platen positioned opposite the plurality of ejectors, the platen being oriented at a first position that is horizontally level, an inductive heater positioned to heat the platen, and a controller operatively connected to the platen, inductive heater and the plurality of ejectors. The controller is configured to operate the plurality of ejectors to eject the drops of material towards the platen and form layers of material with reference to digital image data of the three-dimensional object to produce the three-dimensional object on the platen, rotate the platen to a second position that enables gravity to urge the three-dimensional object off of the platen, and operate the inductive heater to heat the platen and release the three-dimensional object from the platen.

BRIEF DESCRIPTION OF THE DRAWINGS

The foregoing aspects and other features of method and printer are explained in the following description, taken in connection with the accompanying drawings.

DETAILED DESCRIPTION

Figure 1:
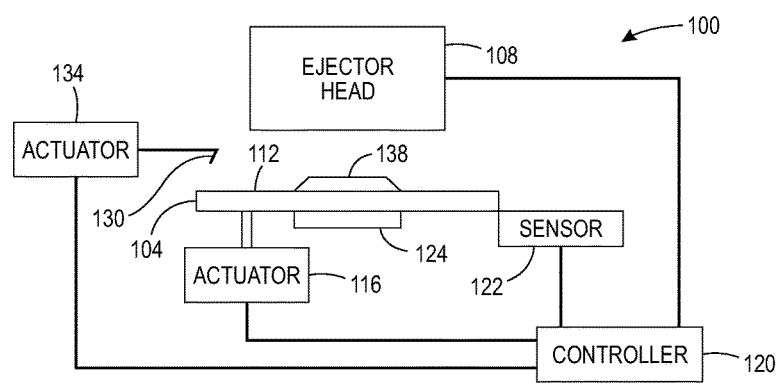
FIG. 1 shows a three-dimensional object printer configured for automated part removal.

For a general understanding of the environment for the method and printer disclosed herein as well as the details for the method and printer, reference is made to the drawings. In the drawings, like reference numerals designate like elements.

FIG. 1 shows a three-dimensional object printer 100 configured for automated part removal. The printer 100 includes a platen 104, an ejector head 108, an actuator 116, an inductive heater 124, a sensor 122, a controller 120, a wiper 130, and an actuator 134. The ejector head 108 has a plurality of ejectors configured to eject material onto a surface 112 of the platen 104. The printer 100 also includes an actuator 116, which is operatively connected to the platen 104 to rotate the platen from the horizontally level position shown in FIG. 1 to the position shown in FIG. 2. The printer 100 further includes a controller 120 operatively connected to the ejector head 108, the actuator 116, the inductive heater 124, and the sensor 128. The controller 120 is configured to operate the ejectors in the ejector head 108 with reference to digital image data of a three-dimensional object to form layers of material and produce a three-dimensional object 138 on the platen 104. The controller is also configured to operate the actuator 116 to rotate the platen to the second position where gravity urges the object towards the edge at which the sensor 122 is positioned and to operate the inductive heater 124 to melt support material adhering to the platen so the object slides towards the edge of the platen. While the heater 124 is shown connected to the platen, it need only be positioned sufficiently close to the platen to heat the platen to the appropriate temperature to release the object and need not be connected to the platen. Once the controller 120 receives a signal from the sensor that indicates the object has been removed from the platen, the controller operates the actuator 116 to return the platen to the horizontal level position for the production of the next object. As used in this document, "horizontally" means a direction that is parallel to the surface 112 of the platen 104 in FIG. 1 and parallel to a face of the ejector head 108.

The position of the platen 104 is depicted as being at a forty-five degree angle to the horizontally level position of FIG. 1. In one embodiment, this angle is the minimum angle at which gravity sufficiently induces the object 138 to move once the inductive heater has melted the material adhering to the platen; however, the angle at which gravity begins to urge movement of an object can be more or less depending upon the platen surface treatment and object support material. The angle of rotation can be up to one hundred and eighty degrees, if the object is to be dropped onto another surface, such as a conveyor as explained below. In embodiments in which the object is to slide onto another surface the orientation can be limited to some angle that is less than one hundred and eighty degrees, depending again on the platen surface treatment and object support material. The platen 104 needs to be made of a ferromagnetic material to ensure that the inductive heater 124 produces heat in the platen 104. Because the fluctuating fields generated by the inductive heater do not interact with the object 138, the temperature of the object does not change so the integrity of the object remains intact. The controller 120 is configured to operate the inductive heater for a period of time that ensures the platen reaches a temperature of at least sixty degrees Celsius, which is the melting temperature for the most commonly used support material, namely, paraffin wax.

Figure 2:
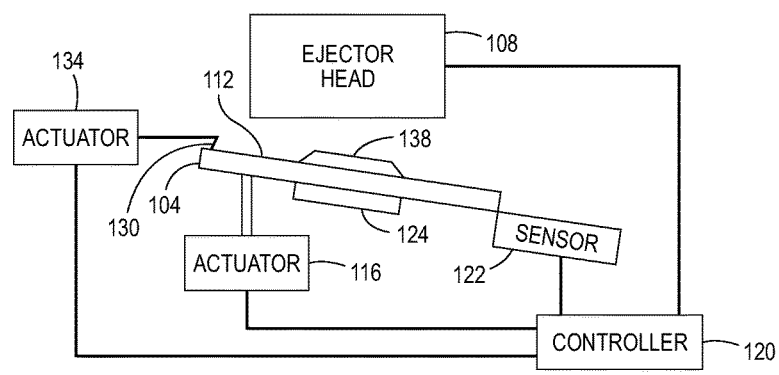
FIG. 2 shows the printer of FIG. 1 with the platen rotated to a position that facilitates removal of objects formed on the platen.

The printer shown in FIG. 1 and FIG. 2 also includes a wiper 130 that is operatively connected to an actuator 134. The controller 120 is also connected to the actuator 134 to enable the controller to operate the actuator and move the wiper 130 across the surface 112 of the platen 104 when the platen is in the position shown in FIG. 2. The controller 120 operates the actuator 134 to move the wiper in response to the sensor 122 generating a signal indicative of the object sliding off the platen and past the sensor 122. The sensor 122 can be, for example, an optical sensor that generates a light beam at the edge of the platen 104 and detects the absence of the beam at a receiver as the object moves between the light generator and the receiver. Other sensors can be used, such as, a mechanical sensor that generates a signal to a controller in response to the object moving a mechanical arm.

Figure 5:
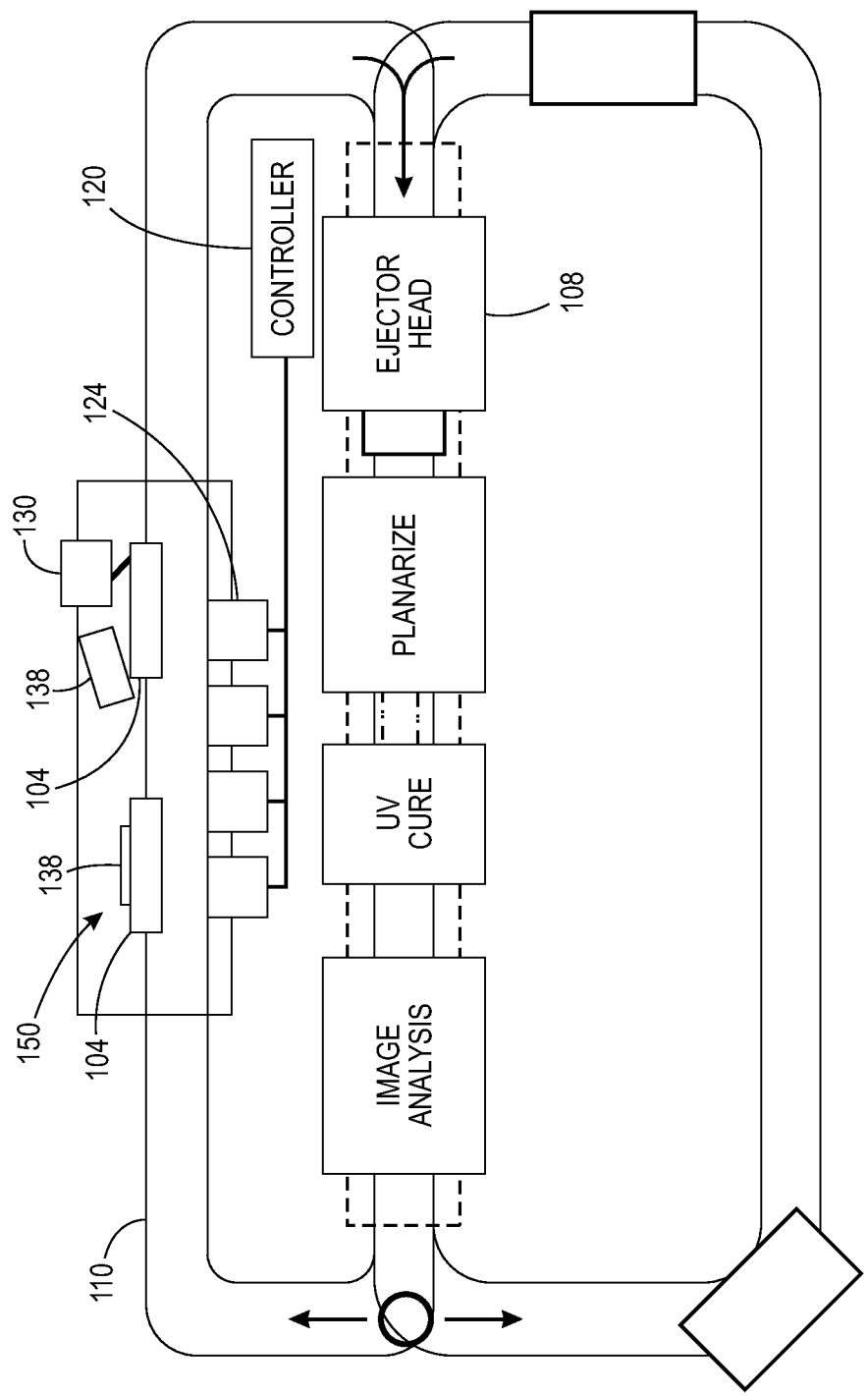
FIG. 5 shows an alternative embodiment of the three-dimensional object printer that rotates the platen as it moves along a track.
Figure 6:
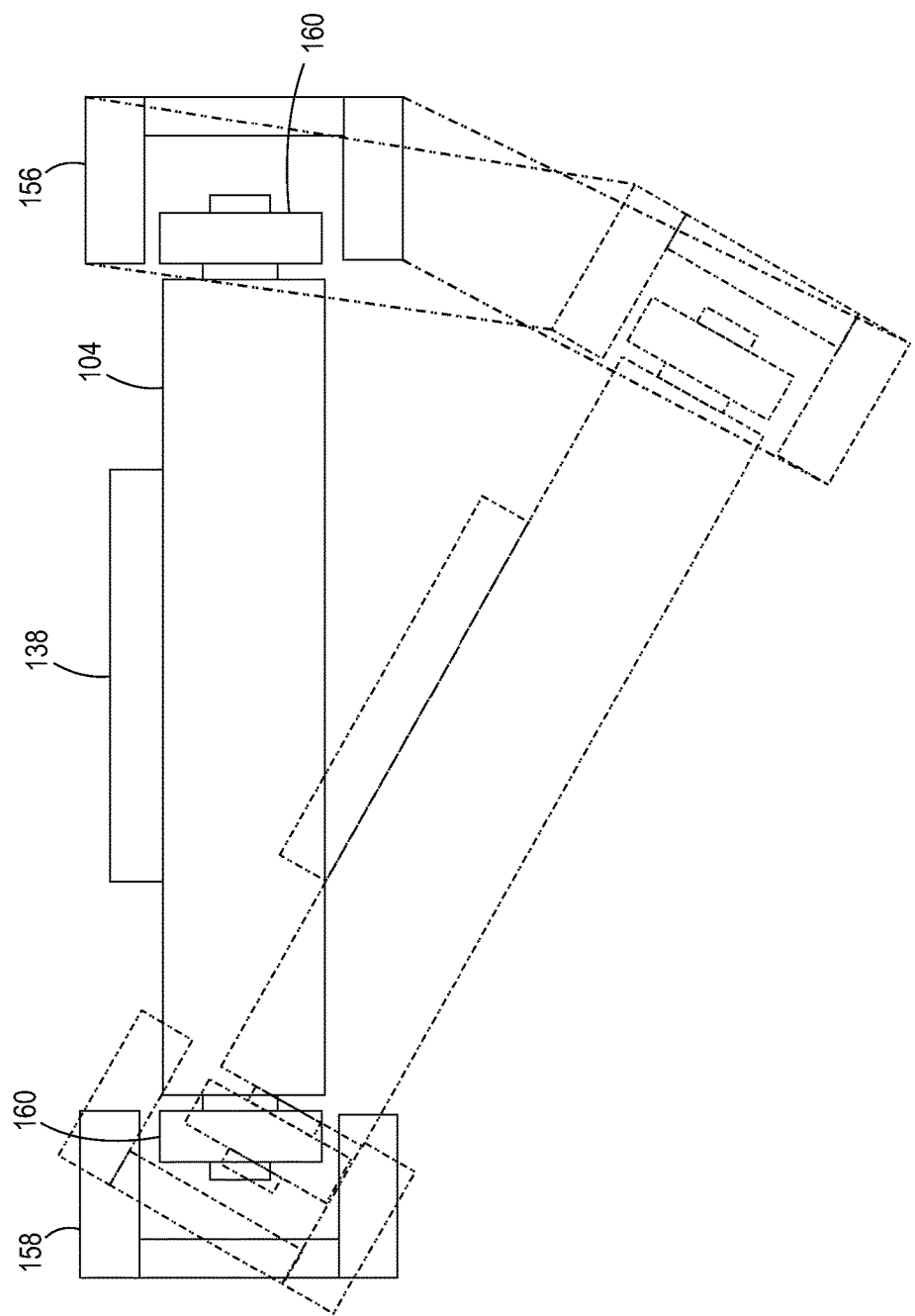
FIG. 6 depicts a change in the track along which the platen moves to enable the platen to rotate to a position to discharge an object.

An alternative embodiment of a three-dimensional object printer that rotates the platen through the movement of the platen along a track is shown in FIG. 5. In this figure, like reference numbers refer to like components in the embodiment of FIG. 1. The platen 104 is configured to move along a track 110. The platen 104 moves underneath the ejector head 108 to enable the formation of one or more layers of an object. The platen can move along the track 110 to enable the top layer of the object to be planerized, UV material cured, or the object to be imaged and the image data analyzed to verify proper formation of the object. A switch in the track is configured to enable the track 110 either to return the platen to the ejector 108 for the formation of additional layers or it can divert the platen to the object discharge area 150. In discharge area 150, the configuration of the track 110 changes to tilt the platen 104 as shown in FIG. 6. As shown in that figure, rails 156 and 158 are configured with a U-shape to hold the wheels 160 of the platen 104. Rail 156 changes elevation while rail 158 turns to enable the platen to rotate at an angle to the horizontal position of the platen. In this position, the part 138 is urged by gravity toward the edge of the platen closest to rail 156. Alternatively, as shown in FIG. 7, both rails can change elevation in opposite directions to turn the platen over and drop the object.

With continued reference to FIG. 5, as the platen travels through the discharge area 150, the track enables the platen 104 to rotate and the controller 120 operates the inductive heaters 124 to heat the platen and raise its temperature to a level that enables the part 138 to be released from the platen. The sensor 122, which is positioned at the edge from which the part falls away, generates a signal that enables the departure of the part 138 from the platen 104 to be detected. The platen 104 continues to move along the track 110 past the wiper 130 that extends across the path of the track 110. As the platen passes the wiper 130, the wiper removes residual material from the platen surface. A receptacle can be positioned beneath the wiper 130 to receive the falling debris cleared from the platen 104 by the wiper 130. The platen 104 continues on the track 110 and returns to the ejector head 108 for production of another part.

Figure 7:
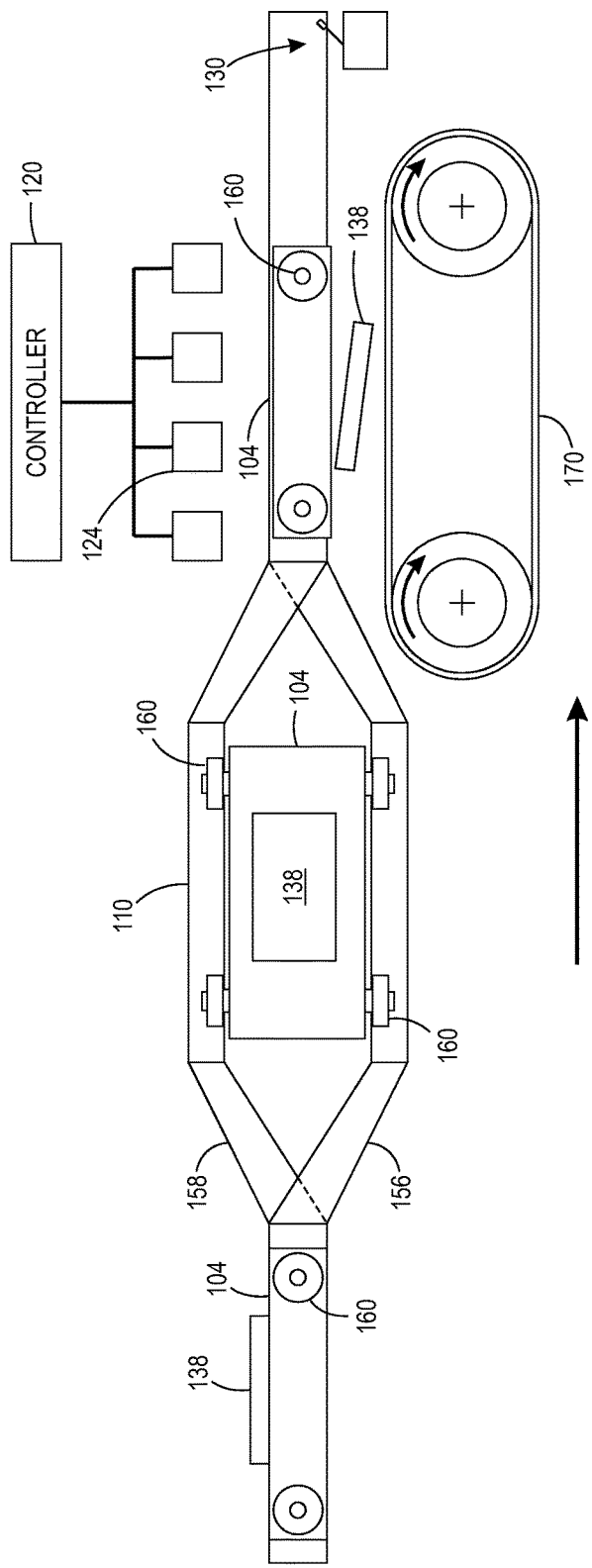
FIG. 7 shows an alternative embodiment of the three-dimensional object printer that inverts the platen as it moves along a track.

In the embodiment shown in FIG. 7, three platens 104 are shown moving along the track 110. Again the platens 104 are configured with wheels 160 for movement along the track. The middle platen has entered an area where the rails 156, 158 of the track 110 are configured to rotate the platen ninety degrees as shown in the figure. The rails 156, 158 to right of that position are configured to further rotate the platen 104 another ninety degrees to invert the platen when it reaches the position of the rightmost platen as shown in the figure. Once the platen is inverted, the controller 120 operates the heaters 124 to heat the platen 104 to a temperature that releases the part 138 from the platen 104 so it falls under the effect of gravity onto a conveyor 170. The conveyor 170 can carry the part to another processing area or it can drop the parts into a receptacle located at the end of the conveyor. A wiper 130 is positioned to remove residual material from the platen as the inverted platen passes the wiper. The platen 104 then passes through another section of the track 110 that returns the platen to the un-inverted position and the platen can be routed to the ejector head for production of another part.

Figure 3:
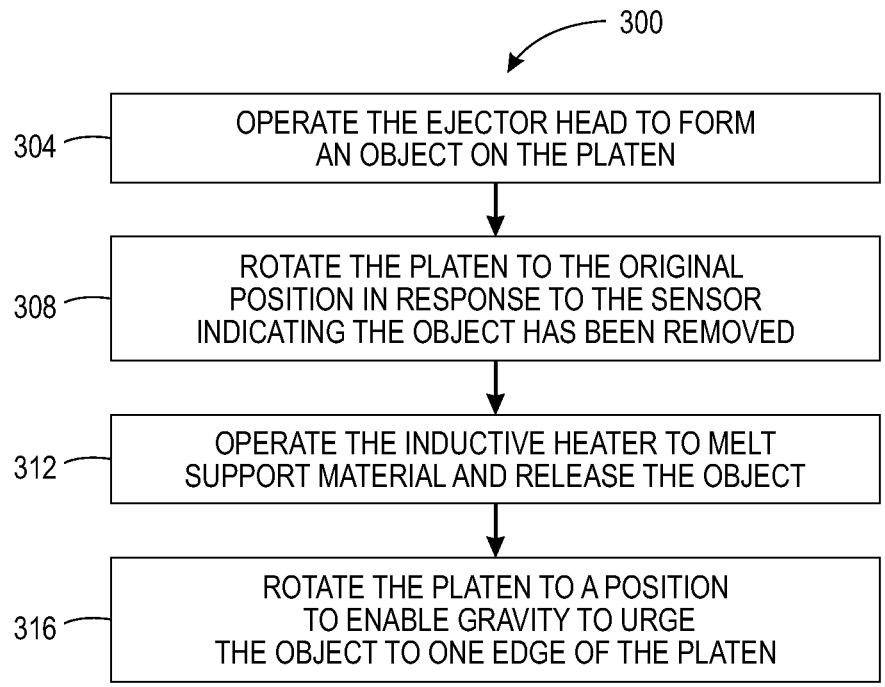
FIG. 3 shows a method for operating the printer of FIG. 1 to release a printed part.

A method 300 for operating the printer 100 to automatically remove printed parts from the platen 104 is shown in FIG. 3. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 120 noted above can be such a controller or processor. Alternatively, the controller can be implemented with more than one processor and associated circuitry and components, each of which is configured to form one or more tasks or functions described herein.

Figure 4:
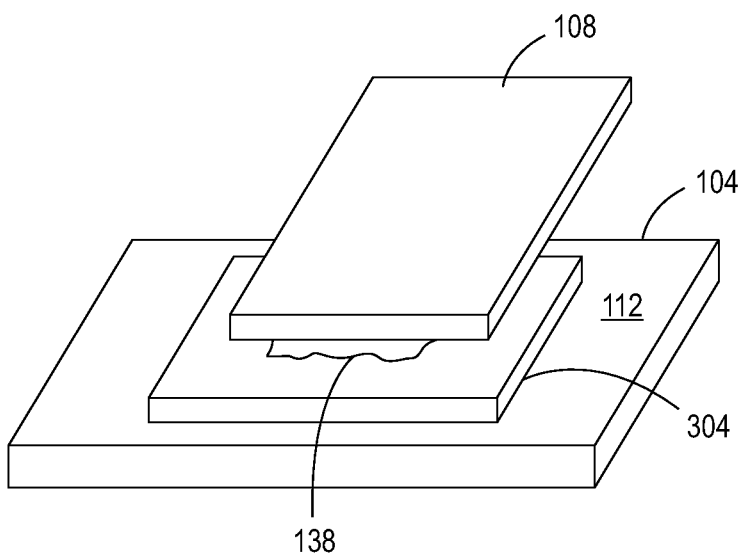
FIG. 4 shows a wax base that is formed to support formation of an object on the platen of the printer shown in FIG. 1.

When the method 300 is performed, it begins with the controller 120 operating ejectors in the ejector head 108 to eject drops of material and form layers of material with reference to digital image data of a three-dimensional object to produce the object on the platen (block 304). In one embodiment, the controller 120 operates a first plurality of ejectors of the ejector head 108 to eject material onto the surface 112 of the platen 104 to form one or more parts on the platen. In another embodiment, the controller 120 first operates a second plurality of ejectors of the ejector head 108 to eject wax onto the surface 112 of the platen 104 to form a wax base 304, as shown in FIG. 4. After forming the wax base 304, the controller 120 operates the first plurality of ejectors of the ejector head 108 to eject material onto the wax base 304 to form the object 138. Once the part has been produced, the cart is tilted to rotate the platen to the second position where gravity urges the object towards the edge at which the sensor 128 is positioned (block 308). As the platen rotates, the controller connects the inductive heater 124 to an electrical power source to operate the heater and melt support material adhering to the platen so the object slides towards the edge of the platen or drops from the platen (block 312). Once the controller 120 receives a signal from the sensor that indicates the object has been removed from the platen, the cart rotates to return the platen to the horizontal level position for the production of the next object (block 316).

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A printer for manufacturing a three-dimensional object comprising:
    a plurality of ejectors configured to eject drops of material;
    a track;
    a platen positioned opposite the plurality of ejectors, the platen being oriented at a first position that is horizontally level and the platen being operatively connected to a motive force that is configured to move the platen along the track;
    an inductive heater positioned to heat the platen; and
    a controller operatively connected to the platen, inductive heater and the plurality of ejectors, the controller being configured to:
        operate the plurality of ejectors to eject the drops of material towards the platen and form layers of material with reference to digital image data of the three-dimensional object to produce the three-dimensional object on the platen;
        rotate the platen to a second position that enables gravity to urge the three-dimensional object off of the platen;
        operate the inductive heater to heat the platen and release the three-dimensional object from the platen; and
        operate the motive force to move the platen along the track at an angle with respect to the first position so the operation of the inductive heater enables the three-dimensional object to fall from the platen.

2. The printer of claim 1 further comprising:
    an actuator operatively connected to the platen; and
    the controller being operatively connected to the platen through the actuator, the controller being further configured to operate the actuator to rotate the platen to a position that is at an angle to the first position to enable gravity to urge the three-dimensional object towards an edge of the platen.

3. The printer of claim 2, the controller being further configured to:
    operate the actuator to rotate the platen to the second position that is at about at a forty-five degree angle to the first position.

4. The printer of claim 2, the controller being further configured to:
    operate the actuator to rotate the platen to the second position that is up to a one hundred and eighty degree angle to the first position.

5. The printer of claim 2 further comprising:
    a wiper configured to move across the platen after the platen has been rotated to the second position;
    another actuator operatively connected to the wiper, the actuator being configured to move the wiper across the platen; and
    the controller is further configured to operate the other actuator to move the wiper across the platen and remove melted material from the platen when the platen is in the second position.

6. The printer of claim 2 further comprising:
    a sensor positioned to detect removal of the three-dimensional object from the platen; and
    the controller is operatively connected to the sensor, the controller further configured to operate the actuator to return the platen to the first position in response to the sensor detecting removal of the three-dimensional object from the platen.

7. The printer of claim 2, the controller being further configured to:
    operate a first group of ejectors in the plurality of ejectors to eject wax onto the platen to form a wax base on the platen; and
    operate a second group of ejectors in the plurality of ejectors to eject material onto the wax base to form the three-dimensional object, the wax base having a footprint that is larger than a footprint of the three-dimensional object.

8. The printer of claim 1 further comprising:
    a wiper that extends across the track; and
    the controller is further configured to move the platen on the track past the wiper to clean the platen as the platen passes the wiper.

9. The printer of claim 8, the track being further configured to rotate the platen one hundred eighty degrees to enable the platen to support a building of another object; and
    the controller is further configured to move the platen along the track to rotate the platen through the one hundred and eighty degrees.

* * * * *